United States Patent Office 2,710,873
Patented June 14, 1955

2,710,873

SATURATED OXO-EPOXY ETHERS AND PROCESS FOR THEIR PREPARATION

Earl W. Gluesenkamp, Centerville, and Tracy M. Patrick, Jr., Dayton, Ohio, assignors to Monsanto Chemical Company, St. Louis, Mo., a corporation of Delaware No Drawing. Application October 26, 1950, Serial No. 192,354

13 Claims. (Cl. 260—348)

This invention relates to a novel process for the preparation of saturated oxo-epoxy ethers comprising the reaction of saturated aldehydes with allyl monoepoxy ethers in the presence of a free radical promoting catalyst and to the products produced thereby.

The saturated oxo-epoxy ethers of this invention can be diagrammatically shown by the structural formula

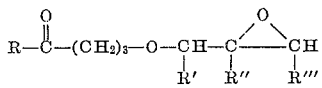

wherein R is a saturated organic radical selected from the group consisting of alkyl, cycloalkyl and oxacycloalkyl radicals containing up to 17 carbon atoms; R' and R" are selected from the group consisting of —H and —CH₃; R''' is selected from the group consisting of —H, —CH₃ and —C₆H₅; and said R', R" and R''' groups are selected such that not more than one carbon-containing group is present.

The saturated 2 to 18 carbon atom aldehydes can be selected from the group consisting of aliphatic, alicyclic and oxaheterocyclic aldehydes, as for example, ethanal, propanal, butanal, pentanal, hexanal, heptanal, octanal, nonanal, decanal, dodecanal, tetradecanal, hexadecanal, octadecanal, 2-ethylhexanal, hexahydrobenzaldehyde, tetrahydrofurfural and the like. The 2 to 8 carbon atom aliphatic aldehydes are preferred.

The allyl monoepoxy ethers can be diagrammatically shown by the structural formula

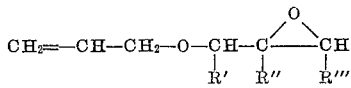

wherein R' and R" are selected from the group consisting of —H and —CH₃; R''' is selected from the group consisting of —H, —CH₃ and —C₆H₅; and said R', R", and R''' groups are selected such that not more than one carbon-containing group is present, for example:

Allyl glycidyl ether
Allyl α-methylglycidyl ether
Allyl β-methylglycidyl ether
Allyl γ-methylglycidyl ether
Allyl α-phenylglycidyl ether The preparation of allyl glycidyl ether is shown in U. S. Patent 2,314,039. Other allyl monoepoxy ethers can be prepared in a similar manner.

The free radical promoting catalysts are, for example, acetyl peroxide, benzoyl peroxide, lauroyl peroxide, stearoyl peroxide, hydrogen peroxide, peracetic acid, sodium perborate, potassium persulfate, and the like. The free radical promoting catalyst is generally employed at from about 0.1 to about 5 mole per cent and preferably from about 0.25 to about 2 mole per cent based on the weight of the total reactants; and the catalyst may be added all at once, in increments or continuously over a period of time.

The temperature at which the reaction is maintained is not critical. The temperature may range from —50° C. to the decomposition point of the reactants but the range of from about 25° C. to about 100° C. is preferred. In general the temperature should be selected such that the free radical promoting catalyst is decomposed at a moderate rate during the course of the reaction, for example, if benzoyl peroxide is the free radical promoting catalyst a temperature in the range of from about 70° C. to about 90° C. is preferred.

The following example is illustrative of the invention:

A 72.0 g. sample (1.0 mole) of redistilled n-butanal was mixed with 38.0 g. (0.33 mole) of allyl glycidyl ether in a 250-ml. reaction flask fitted with a reflux condenser and the mixture was brought to reflux (82.5° C.), at which time 0.5 g. of benzoyl peroxide was added thereto. Refluxing was continued for 48 hours, additional 0.5 g. samples of benzoyl peroxide being added at 16 and 24.5 hours, the reflux temperature being 83.1° C. and 83.7° C. respectively. The final reflux temperature of the light yellow reaction mixture was 84.5° C.

The reaction mixture was distilled through a ten-inch Vigreux fractionating column and the excess butanal and unreacted ether were recovered. The remaining reaction mixture consisted essentially of substantially equal portions of the 1:1 adduct and a telomeric product. The 1:1 adduct was a colorless liquid having a boiling point of 88–89° C. at 0.7 mm., a density $$\left(\frac{25}{25}\right)$$

of 0.9979, and a refractive index of 1.4498 at 25° C. The material was identified as glycidyl 4-oxoheptyl ether by molar refraction, elemental analysis and infrared absorption spectrum analysis.

The reaction can be shown as follows:

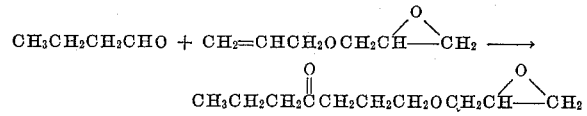

Other compounds which may be prepared by the free radical induced reaction described herein are, for example:

Glycidyl 4-oxoamyl ether
Glycidyl 4-oxohexyl ether
Glycidyl 4-oxodecyl ether
Glycidyl 4-oxoundecyl ether
Glycidyl 4-oxoheneicosyl ether
Glycidyl 5-ethyl-4-oxononyl ether
Glycidyl 4-cyclohexyl-4-oxobutyl ether
Glycidyl 4-tetrahydrofuryl-4-oxobutyl ether
α-Methylglycidyl 4-oxoheptyl ether
β-Methylglycidyl 4-oxoheptyl ether
γ-Methylglycidyl 4-oxoheptyl ether
α-Phenylglycidyl 4-oxoheptyl ether The novel products of this invention are valuable as plasticizers, solvents, and chemical intermediates wherein the epoxy structure reacts with water, acids, ammonia, amines, alcohols, mercaptans, and other compounds in the typical reactions characteristic of the epoxy structure.

We claim:

1. A compound having the formula

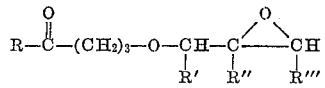

wherein R is a saturated hydrocarbon radical containing up to 17 carbon atoms; R' and R" are selected from the group consisting of —H and —CH₃; R''' is selected from the group consisting of —H, —CH₃ and —C₆H₅; and said R', R" and R''' groups are selected such that not more than one carbon-containing group is present.

2. A compound having the formula

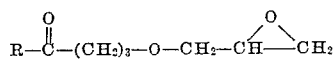

wherein R is an alkyl radical containing up to 7 carbon atoms.

3. The compound glycidyl 4-oxoheptyl ether having the formula

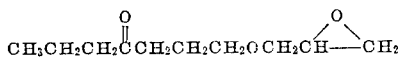

4. The compound glycidyl 4-oxoamyl ether having the formula

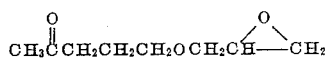

5. The compound glycidyl 4-oxohexyl ether having the formula

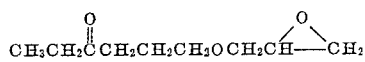

6. The compound glycidyl 4-oxodecyl ether having the formula

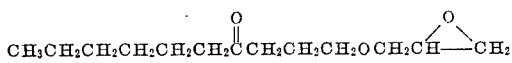

7. The compound glycidyl 5-ethyl-4-oxononyl ether having the formula

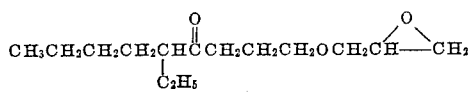

8. The process comprising the reaction of a molar excess of an aliphatic aldehyde containing from 2 to 8 carbon atoms, inclusive, said aldehyde having the formula RCHO wherein R is an alkyl radical, with allyl glycidyl ether in the presence of a peroxygen free radical promoting catalyst.

9. The process comprising the reaction of a molar excess of (A) butanal with (B) allyl glycidyl ether in the presence of (C) from about 0.25 to 2 mole per cent, based on the total reactants, of benzoyl peroxide.

10. The process comprising the reaction of a molar excess of (A) ethanal with (B) allyl glycidyl ether in the presence of (C) from about 0.25 to 2 mole per cent, based on the total reactants, of benzoyl peroxide.

11. The process comprising the reaction of a molar excess of (A) propanal with (B) allyl glycidyl ether in the presence of (C) from about 0.25 to 2 mole per cent, based on the total reactants, of benzoyl peroxide.

12. The process comprising the reaction of a molar excess of (A) heptanal with (B) allyl glycidyl ether in the presence of (C) from about 0.25 to 2 mole per cent, based on the total reactants, of benzoyl peroxide.

13. The process comprising the reaction of a molar excess of (A) 2-ethylhexanal with (B) allyl glycidyl ether in the presence of (C) from about 0.25 to 2 mole per cent, based on the total reactants, of benzoyl peroxide.

No references cited.